United States Patent [19]
Knoll et al.

[11] Patent Number: 5,990,236
[45] Date of Patent: *Nov. 23, 1999

[54] PREPARATION OF IMPACT-RESISTANT POLYSTYRENE

[75] Inventors: Konrad Knoll, Mannheim; Wolfgang Loth, Bad Duerkheim; Hermann Gausepohl, Mutterstadt, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/886,284

[22] Filed: Jul. 1, 1997

Related U.S. Application Data

[63] Continuation of application No. 08/590,625, Jan. 24, 1996, abandoned, which is a continuation of application No. 08/136,937, Oct. 18, 1993, abandoned.

[51] Int. Cl.⁶ .......................... C08F 279/00; C08L 53/02
[52] U.S. Cl. ................. 525/53; 525/54; 525/88; 525/89; 525/314; 525/315; 525/316; 525/250
[58] Field of Search ................... 525/53, 54, 88, 525/89, 314, 315, 316, 250

[56] References Cited

U.S. PATENT DOCUMENTS

| | | | |
|---|---|---|---|
| 3,356,763 | 12/1967 | Dollinger et al. | 525/314 |
| 3,475,514 | 10/1969 | Nemphos et al. | 525/314 |
| 3,658,946 | 4/1972 | Bronstert et al. . | |
| 3,660,535 | 5/1972 | Finch et al. . | |
| 3,801,520 | 4/1974 | Hogan et al. | 525/314 |
| 4,143,647 | 3/1979 | Glukhovskoi et al. . | |
| 4,388,447 | 6/1983 | Iwamoto et al. | 525/316 |
| 4,421,895 | 12/1983 | Echte et al. | 525/53 |
| 5,240,993 | 8/1993 | Aerts et al. | 525/52 |

FOREIGN PATENT DOCUMENTS

| | | | |
|---|---|---|---|
| 2 140 081 | 2/1972 | Germany . | |
| 1 770 392 | 3/1972 | Germany . | |
| 1 206 800 | 9/1970 | United Kingdom | 525/314 |

*Primary Examiner*—Mark L. Warzel
*Attorney, Agent, or Firm*—Keil & Weinkauf

[57] ABSTRACT

Abstract of the disclosure: A process is described for the continuous preparation of an impact-resistant molding material by anionic polymerization of styrene or another aromatic vinyl compound or mixtures thereof in the presence of a solvent and a block rubber, wherein the polymerization is carried out in at least 2 reaction vessels that together form a reactor cascade, the monomer stream being subdivided among the reaction vessels present, the living polymer chain ends being terminated in a conventional manner and the solvent being removed.

9 Claims, No Drawings

PREPARATION OF IMPACT-RESISTANT POLYSTYRENE

This application is a continuation of application Ser. No. 08/590,625, filed on Jan. 24, 1996, now abandoned, which is continuation of application Ser. No. 08/136,937, filed on Oct. 18, 1993 now abandoned.

The present invention relates to a process for the continuous preparation of a low-monomer, impact-resistant molding material based on styrene or another aromatic vinyl compound in the presence of a rubber-elastic block copolymer based on an alkadiene and an aromatic vinyl compound.

Impact-resistant molding materials based on polystyrene are normally prepared by free-radical polymerization of styrene in the presence of an elastomer component.

The conversion of styrene is generally 90–95%. The unpolymerized residue and any oligomers present and also the solvent have to be removed (degassed) as completely as possible, which in practice leads to considerable difficulties. Numerous attempts have previously been made to improve the degassing of the polystyrene molding materials. For example, attempts have been made to reduce the residual monomer content by using entraining agents such as nitrogen, water, methanol and ethanol, and also special degassing equipment has been designed in order to achieve improved degassing.

However, the disadvantage of the subsequent removal of the remaining monomers from polystyrene is that relatively high temperatures have to be employed, at which a polymerization-depolymerization equilibrium becomes established. The result is that new monomer and also oligomers are continuously re-formed and consequently residual monomer contents of at least 100 ppm have hitherto always remained.

On the other hand, it is known that complete conversion and thus a very low residual monomer content can be achieved by anionic polymerization. However, up to now only either homopolymers of styrene or butadiene (or their equivalents) or block copolymers have been prepared using this method. The preparation of impact-resistant polystyrene by anionic polymerization on the other hand has not been considered, which is surprising since the preparation specifically of the block copolymers, ie. the types of rubber that are used to prepare impact-resistant polystyrene, has long been performed in this way.

It is an object of the present invention to prepare impact-resistant molding materials based on aromatic vinyl compounds that have the usual mechanical behavior and low residual monomer contents.

We have found that this object is achieved by dissolving a block copolymer based on an alkadiene and an aromatic vinyl compound in a solvent, if necessary removing residues of polar impurities, chiefly water, ie. for example titrating out with a suitable organometallic compound, and reacting the aromatic vinyl compound in this solution anionically and continuously in a reactor cascade to form the thermoplastic molding material, the monomer stream being subdivided among the individual reactors (reaction vessels).

The advantage of the process according to the invention is in particular the fact that impact-resistant thermoplastic molding materials having a residual monomer content of less than 10 ppm can be prepared in this way. Also, there is no formation of oligomeric products which can lead to undesirable mold deposits during the processing of the thermoplastic molding materials. Moreover, it leads to a fairly simple, easily managed type of process.

The reactor cascade comprises a plurality of reaction vessels or zones that are each provided with a connection for the addition of the monomer, ie. the aromatic vinyl compound and whose first zone also has connections for the addition of rubber solution and the initiator.

Suitable reaction vessels for a reactor cascade are vessels as used for the preparation of impact-resistant polystyrene by free-radical polymerization and as described in detail in for example U.S. Pat. No. 3,658,946 or U.S. Pat. No. 3,660,535. Accordingly, continuously traversed stirred bottles and also tubular reactors (polymerization towers) can be used for the individual vessels. A 2-kettle/2-tower cascade is preferred for the process according to the invention. However, in contrast to free-radical polymerization it is essential and necessary that the monomer stream should be subdivided among each of the reaction zones present, depending on the desired degree of conversion. In terms of reactor type, the kettle(s) can be considered back-mixed reaction zones while the tower reactors are predominantly plug-flow.

In a suitable reaction procedure, a conversion of more than 99.8% is achieved in the last tower of the cascade. In order to achieve a conversion of more than 99.99%, it is useful to connect up, downstream of the reactor cascade, a short residence-time section into which back-mixing does not-continue, ie. which is exclusively a plug-flow regime. This section may for example comprise a tubular reactor or static mixer, exactly, that is, equipment that operates without back-mixing.

The polymerization can be carried out at from 30° C. to 120° C. However, preferred temperatures are from 60 to 90° C., since the rate of polymerization is relatively low at low temperatures and spontaneous termination of the living chain ends is observed to increase at higher temperatures. The molecular weight of the thermoplastic molding material is regulated by the ratio of the amount of initiator to monomer and can thus be set extremely accurately. The molecular weight distribution is determined on the one hand by the residence time of the polymer mixture in the individual reactors, and on the other hand can be regulated by subdividing the initiator stream among the individual reactors.

After the polymer solution has left the last reaction zone, the living chain ends are conveniently terminated with a proton-active substance. Suitable substances include for example alcohols such as methanol, ethanol, isopropanol or, in particular, $CO_2$ and water.

The polymer solution treated in this way can be worked up in a conventional manner, ie. freed from the solvent, and conventional additives such as stabilizers, lubricants or antistats can be introduced.

Suitable solvents for the process according to the invention are hydrocarbons that are inert under the reaction conditions and that preferably have from 4 to 12 carbon atoms, such as toluene, ethyl benzene, methylcyclohexane, cyclohexane or xylene, and also certain ethers, for example tetrahydrofuran or diisopropyl ether. It is essential that these solvents be free from protonactive impurities, which would decompose the organo-metallic initiator. The solvents are therefore expediently distilled before use and thoroughly dried. The residual traces of impurities, chiefly water, are titrated out at room temperature in the presence of very small amounts of the aromatic vinyl compound to be polymerized.

Monofunctional and also bifunctional organo-metallic compounds can be used to initiate the polymerization of the aromatic vinyl compounds by the process according to the invention. n-Butyllithium or sec-butyllithium are preferred since they are inexpensive and convenient to use.

In order to obtain impact-resistant molding materials, the aromatic vinyl compound is polymerized in the presence of an elastomer component. Suitable elastomer components include block rubbers based on butadiene or isoprene and styrene of the S-B, S-B-S or B-S-B and/or S-B-S-B types having a styrene content (S) of from 5 to 70%. The ratio of alkadiene (B) to styrene (S) in the elastomer phase determines the particle structure, which forms in the phase transition during the polymerization of the aromatic vinyl compound. Relevant details can be found in the publication by Echte et al. in Angew. Makromol. Chem 90, (1980) 95. The elastomer is used in an amount of from 3 to 25%, preferably from 5 to 20%, based on the thermoplastic molding material.

Aromatic vinyl compounds for the purposes of the invention include anionically polymerizable substances of the type comprising styrene itself and its substitution products. Examples include α-methylstyrene, ethylstyrene, vinyltoluene or tert-butylstyrene. These compounds can be used alone or mixed with one another.

In order to obtain molding materials having good toughness properties, it is convenient to form the aromatic vinyl fraction of the elastomer component using the compound from which the hard matrix is prepared, too.

EXAMPLE 1

10 parts of a butadiene-styrene two-block rubber having a polystyrene block with a molecular weight of 45,000 mol and a polybutadiene block with a molecular weight of 180,000 were dissolved in 45 parts of distilled toluene dried over $Al_2O_3$.

A cascade comprising two stirred kettles and two tower reactors (cf. DE 1770392) was used; the kettles had a volume of 1 and 2 liters respectively and the tower reactors had a volume of 4 liters each.

This solution was added to the first stirred kettle at a rate of 0.55 kg/hour. A 1% strength solution of sec-butyllithium was also continuously added to the first reactor at a rate of 40 ml/hour. The total amount of 0.9 kg/hour of styrene was subdivided among the four reactors in the ratio 1:2:3:3. The polymerization temperature in the individual reactors was 70/70/80 and 90° C. The solids content after the last reactor reached 68.9%, corresponding to a styrene conversion of 100%.

A sufficient amount of water and $CO_2$ was added to the polymer stream flowing from the last reactor. The polymer solution was then passed to a degassing unit and degassed at 200° C. and 3 mbar. The content of unpolymerized styrene in the finished impact-resistant polystyrene molding material was determined by gas chromatography and found to be 8 ppm.

EXAMPLE 2

Example 1 was repeated, except that the initiator was subdivided in the ratio of 1:1 among the first stirred kettle and the first tower reactor, and the temperatures in the first and second reactors were raised to 75° and 80° C. The residual monomer content in this case was 5 ppm.

We claim:

1. A process for the continuous preparation of an impact resistant molding material based on aromatic vinyl compounds by anionic polymerization in a reactor cascade of at least two reactions vessels comprising the steps of
    a) dissolving a block copolymer based on an alkadiene and an aromatic vinyl compound in a solvent,
    b) adding this solution and an organometallic compound as anionic polymerization catalyst to the first of said at least two reaction vessels, where the anionic polymerization of the aromatic vinyl compound in the presence of the block copolymer takes place,
    c) subdividing the aromatic vinyl compound and adding it continuously among the reaction vessels, and
    d) terminating the living chain ends after the polymer solution has left the last reaction zone with a proton-active agent.

2. A process as defined in claim 1, wherein the block copolymer is based on butadiene or isoprene and styrene of the type selected from the group consisting of S-B, S-B-S, B-S-B and/or S-B-S-B having a styrene content (S) of from 5 to 70 wt. %.

3. A process as defined in claim 1, wherein the solvent used is toluene, ethyl benzene, cyclohexane or methylcyclohexane.

4. A process as defined in claim 1, wherein the living chain ends are terminated after the polymerization with a proton-active substance.

5. A process as claimed in claim 1, wherein the living chain ends are terminated with a member selected from the group consisting of alcohols, $CO_2$, water and $CO_2/H_2O$.

6. A process as defined in claim 1, wherein the polymerization is carried out at from 40 to 150° C.

7. A process as defined in claim 1, wherein the styrene/diene block rubber used comprises styrene-butadiene block copolymer copolymers having a weight ratio of styrene to butadiene of from 5:95 to 65:35.

8. A process as defined in claim 1, wherein a styrene or other aromatic vinyl compound or mixtures thereof conversion of more than 99.8% is provided.

9. A process as defined in claim 1, wherein the initiator is subdivided among two or more or all the reaction vessels.

* * * * *